United States Patent [19]
Payne

[11] 4,129,006
[45] Dec. 12, 1978

[54] MODULAR EROSION CONTROL SYSTEM

[75] Inventor: Peter R. Payne, Annapolis, Md.

[73] Assignee: Sylvia M. Payne, Annapolis, Md. ; a part interest

[21] Appl. No.: 798,558

[22] Filed: May 19, 1977

[51] Int. Cl.² ............................................. E02B 3/06
[52] U.S. Cl. .................................................. 405/31
[58] Field of Search ...................... 61/3, 2, 4, 5, 18, 37

[56] References Cited

U.S. PATENT DOCUMENTS

| | | | |
|---|---|---|---|
| 870,930 | 11/1907 | Church | 61/18 X |
| 954,283 | 4/1910 | Hawkes | 61/4 |
| 1,353,001 | 9/1920 | Uriarte | 61/4 |
| 2,080,045 | 5/1937 | Hornsby | 61/18 |
| 3,890,790 | 6/1975 | Lamy | 61/4 |

*Primary Examiner*—Jacob Shapiro
*Attorney, Agent, or Firm*—Sughrue, Rothwell, Mion, Zinn and Macpeak

[57] ABSTRACT

A modular unit for erosion control due to wave action is disclosed. The system utilizes a series of symmetrical units linked together to dissipate the kinetic energy of incoming waves. Symmetry of building blocks enables the device to work in any orientation. Energy dissipators on each block allow the wave action to be broken up while allowing passage of water through the unit.

9 Claims, 3 Drawing Figures

MODULAR EROSION CONTROL SYSTEM

BACKGROUND OF THE INVENTION

1. Field of the Invention

This invention relates to erosion control devices for shorelines.

2. Prior Art

Erosion of shorelines as a consequence of wave action is a well recognized phenomenon. The prior art is replete with numerous attempts and various structures to minimize this problem. Generally, erosion is a function of a persistent wave action exerted on beaches comprised of sand or fine shingled material and is most frequently encountered along shorelines of large bodies where such action can be generated. As a consequence of this persistnet wave action, material on the shore tends to be loosened by the wave action and the continuous reciprocating movement along that shoreline causes such materials to generally erode away. The problems of erosion are well known and are emphasized in situations of exceptionally long shorelines where the phenomena of littoral drift is enhanced. In those situations, breakwaters and the like only tend to emphasize downstream erosion problems.

In view of the fact that the dynamics of the problem are well understood and that erosion is a commonplace occurrence, the prior art has been highly developed in this area. Despite that development, various problems exist in these devices which have generally resulted in no one proposal being widely accepted. Accordingly, erosion control is the subject of continuing research.

One class of prior art devices attempts to deal with the problem by means of massive bulwarks or other large structures. These devices are very cumbersome, expensive and difficult to install.

To overcome the problems of installation and general size, various prior art attempts have been made to modularize components. One such attempt is shown in U.S. Pat. No. 3,875,750 wherein a modular device having a series of peaks and depressions is shown to break up various wave action phenomena. The return paths 44 and 46 shown in FIG. 2 of that patent allow water from the dissipated wave to return back to the body. Various arrangements of these components are utilized to build up a continuous breakwater for dissipation of waves. Also, as a consequence of the use of a return path for water, sand and loose material carried by the waves is allowed to build up behind the barricade, thereby building up the shoreline on the land side of the sea wall. One difficulty with the device shown in this prior art patent is that its orientation is critical vis-a-vis the wave action, and in the case of extraordinary waves, if the device is tipped over on its side, it will be rendered inoperative. Also, the costs of construction might be high in view of the intricate patterns involved.

To overcome the cost problem, U.S. Pat. No. 3,894,397 defines an erosion device utilizing ordinary concrete blocks having courses interlocked between them. As in the case of other prior art devices, extraordinarily large wave action may disorient or tip such a device thereby rendering it inoperative and leading to its early destruction by wave action. Another problem tending to increase the cost of such a device is the fact that because ordinary concrete building blocks are utilized, the path for water is exceptionally large and the dissipation of kinetic energy in the wave is relative inefficient. Therefore, additional elements in the form of flappers 30 shown in FIGS. 5 and 6 are required to dissipate wave action to a greater extent than that attained solely by the concrete block pattern and also to facilitate the removal of entrained materials in the waves themselves. Bonding techniques are weak, and blocks become loose.

Other types of prior art erosion devices are typified by mechanical structures which are erected and anchored in the shoreline to interrupt and disperse wave action by means of a series of baffles. U.S. Pat. Nos. 3,309,876 and 3,845,630 typify this class or prior art devices. Such devices, which require anchoring to the seabed, are expensive and difficult to maintain. Additionally, while located below the low means water level at the particular area of installation, such devices, nevertheless, present a menace to navigation since they are generally unmarked and unknown to mariners.

A third class of devices is typified by U.S. Pat. No. 3,952,521 and relate to portable erosion control devices. As is readily apparent, the device as typified by that patent is large, complicated in shape, and generally expensive. While the advantage of mobility ensues with those devices, their general expense and unmanageability have condemned attempts in that direction.

SUMMARY OF THE INVENTION

This invention builds on these prior art attempts at devising a suitable erosion control system by utilizing an easy to fabricate modular construction of symmetrical relationship. The use of modular construction techniques enhances the fabrication at the erosion site, yet reduces the cost of manufacture. Manufacturing costs are reduced because a multitude of identical elements are coupled together to form the completed unitary structure. Additionally, the design of the present invention departs from the prior art by utilizing a symmetrical shape adaptable for use in any orientation vis-a-vis the wave action such that tipping over of the device will result in the same action, that is, wave control, taking place as in any other orientation. The only requirement is that the axis of alignment of the individual modules lays generally parallel to that of the wave line.

The present invention utilizes a series of baffles and passageways to produce a turbulent flow pattern thereby resulting in the deposits of sand or loose shale material in the area around the erosion control device. Accordingly, entrained materials carried by the waves are deposited on the beach about and behind the control device to establish and fortify existing beach topology. Because these devices are placed on the beach themselves, the problem of erosion downstream as a function of the littoral drift patterns is eliminated.

Accordingly, it is an object of this invention to produce an inexpensive yet workable beach erosion control system.

It is yet another object of this invention to define a modular erosion control system having unitary parts which are identical and easily handled.

Still another object of this invention is the provision of an erosion control system of modular construction, utilizing low cost concrete materials to reduce manufacturing costs.

A further object of this invention is to provide for a beach control device which breaks up wave action yet allows the deposit of entrained materials carried by the waves.

DESCRIPTION OF THE PREFERRED EMBODIMENT

Figure 1:
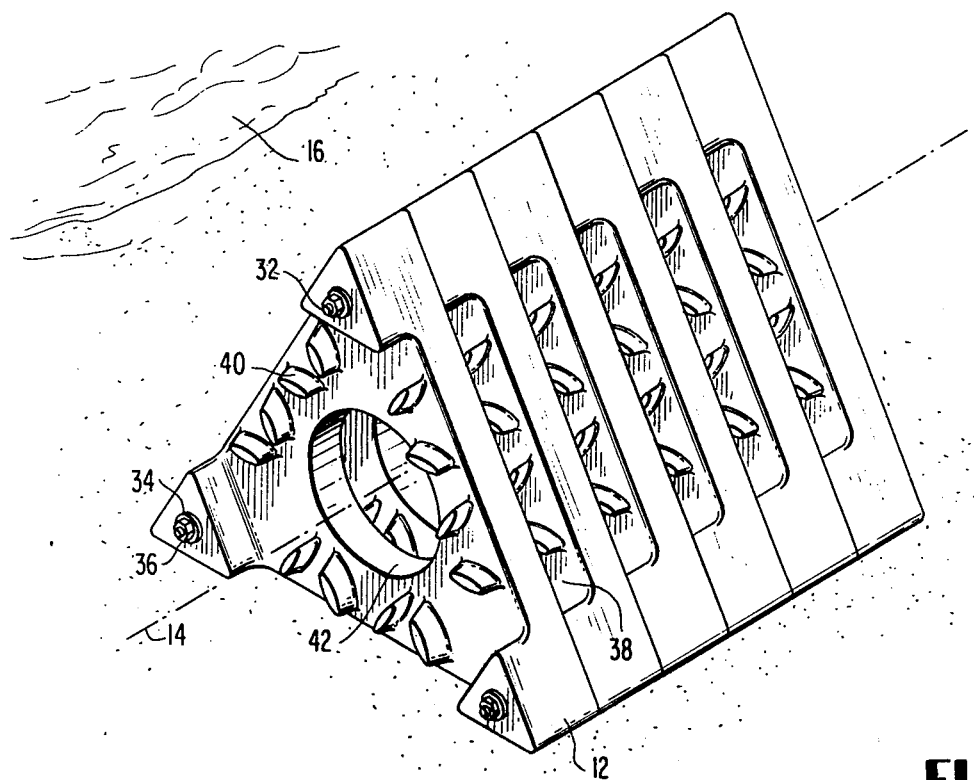
FIG. 1 is a perspective view of an assembled beach erosion control device showing one completed unit.

Referring now to the figures, a modular device is shown as element 10 in FIG. 1. The structure may comprise any number, and in FIG. 1 six identical modules 12 which are aligned along an axis 14 are shown for illustration. The axis 14 defining the alignment of the modular 10 is disposed in a general parallel relationship to a wave line shown schematically as 16. The completed modules are assembled at the beach site and are located at the position to receive waves on the beach at a mean position at a mean tide location. Accordingly, some waves may not reach the erosion control device while others, in view of intensity of storm action, may actually submerge the device. However, a significant percentage of waves will be effectively dissipated by such a device. While one module 10 is shown, it is apparent that a succession of modules can be built up and placed in any orientation to follow the beach line and wave pattern.

Figure 2:
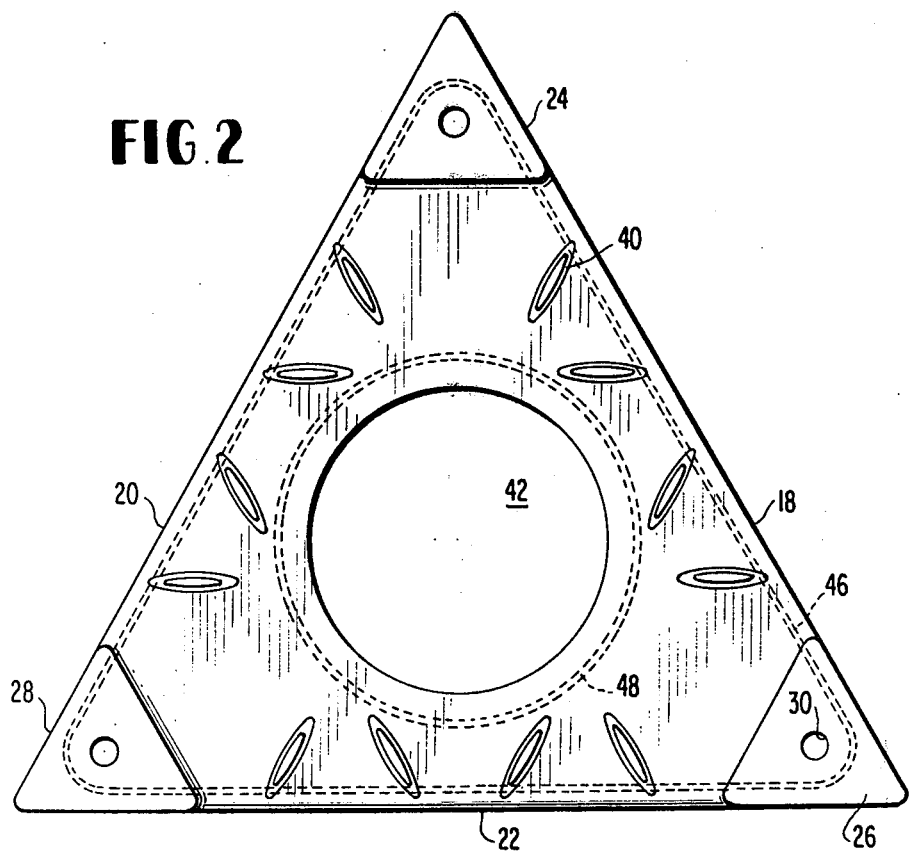
FIG. 2 is an end view of one module of the erosion control device.
Figure 3:
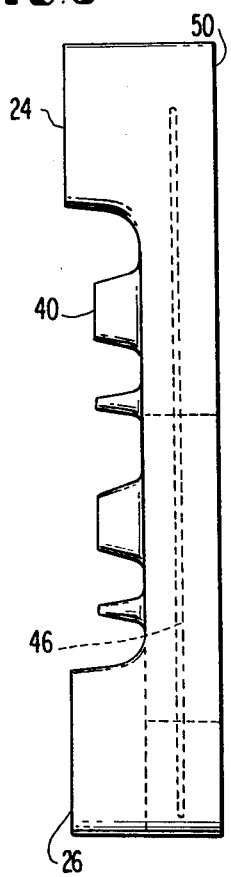
FIG. 3 is an end view of the module shown in FIG. 2.

As shown in FIGS. 2 and 3, the individual sections 12 are shaped as equilateral triangles having equal sides 18, 20 and 22. The importance of a general symmetrical shape in these devices is crucial since wave actions have a tendency to move or topple conventional erosion control devices. Accordingly, if, for example, the module 10 as shown in FIG. 2 is resting on base 22, wave action incident on face 20 may cause the device to rotate clockwise such that face 18 then becomes the base. Even in such an orientation, it is apparent that the symmetrical design would yield identical performance in this new orientation. At each corner of each section is disposed a flange or projection 24, 26 and 28. Within these projections are a series of holes 30 to enable tie rods 32 to be placed therein. Tie rods 32 disposed in each projection are suitably coupled by means, for example, of washers 34 and nuts 36 to lock the individual sections together forming a complete module.

As will be explained herein in more detail, these projections, form recesses 38 between the sections for purposes of generating turbulence in the wave action which is incipient on the erosion control device. On one face of the section are a series of turbulence inducers 40 shown best in the pattern in FIG. 1. While twelve such turbulence inducers are shown, it is readily apparent that any convenient number can be used in any convenient design. As wave action, for example, strikes on face 20, kinetic energy is dissipated as the wave moves through and over the structure. As water moves through the cavity 38, turbulence inducers 40 introduce a series of eddies and discontinuities into the flow generally dissipating the kinetic energy contained therein. A center opening 42 is placed in each section to allow free fluid communication between the sections comprising the module. Accordingly, the build-up of water in any particular section of the module can be dissipated by flow through the center projections 42 to other parts of the module.

As shown in FIGS. 2 and 3, reinforcing rods can be placed in the interior of each section. One such reinforcing rod 44 is placed about the periphery of the section to strengthen the peripheral edges. A second reinforcing rod 48 may be placed concentric with the central opening 42 to add strengthening material in the center of each section.

Each individual section may be cast utilizing concrete materials with the reinforcing elements, if desired, placed in the mold during the pouring process.

Because each section contains one flat or back side 50, molding is rendered especially easy. In that regard, molding can take place at any convenient site with the sections cast in a simple two-part mold. While dimensions are not crucial, each section may be typically 2-6 feet on a side depending on wave action and the beach to be built up. Each section could be approximately one foot in width or thickness.

The tie rods 32 and various assembly components such as washers 34, nuts 36 should preferably be fashioned from a material having a generally good property against corrosion in a salt air environment. Typically, stainless steel rods and hardware can be used. To improve the bonding between sections, epoxy glue may be utilized on the projections 24, 26 and 28 to facilitate a bond between the sections 12.

While the turbulence inducers 40 are shown as having a general tapered or air foil shape, it is apparent that other shapes may be used. The general requirement is that these devices exhibit a high propensity for inducing turbulence into incipient flow of water thereby destroying the kinetic energy in the wave itself.

In operation, wave action with entrained sand or loose shale material strikes the composite module 10 and kinetic energy in the wave is dissipated. Accordingly, about and behind the erosion device deposits of sand or the like material will be placed since with decreased kinetic energy, those materials will precipitate out of the wave by the effects of gravity. Water will then return through various channels 38 and opening 42 in the section to the water line 16. During this reverse cycle, any sand or material which still remains in the water will be further removed by the action of the turbulence inducers 40. Hence, a deposit of sand will take place on the seaward side of the erosion control device.

While concrete is the preferred material for ease of fabrication and cost considerations, it is apparent that other materials may be used. For example, fiberglass composite material may be used, or each section may be hollow and filled with water to add the necessary weight component necessary to anchor the material in the beach. Also, although not shown in the figures, additional anchoring materials such as braces or extensions can be used and attached to the tie rods 32 at convenient locations in the assembly.

It is readily apparent that other modifications and alterations may be derived from this disclosure without departing from the essential aspects of this invention.

What is claimed is:

1. In a shore erosion system of the type having a series of individual modules joined to form a composite structure, the improvement comprising, each individual module having a substantially symmetrical equilateral triangle outside wall configuration, each module having a wall surface aligned substantially perpendicular to movement of waves, a series of aerodynamically shaped baffles projecting from said wall surface, wherein uniform wave dissipation occurs about any symmetrical outside wall.

2. The system of claim 1 wherein each corner of the triangle has a projection thereon, each projection having hole and joining means projecting through said holes to join said modules together.

3. The system of claim 1 wherein said modules are joined wth said flat faces abutting said projections.

4. The system of claim 1 further comprising thereon, a central opening projecting through said face, and wherein said baffles are positioned about said opening.

5. The system of claim 4 further including first reinforcement means disposed about the circumference of said triangle and second reinforcement means disposed concentric with said opening.

6. The system of claim 5 wherein said baffles are aerodynamically shaped.

7. The system of claim 1 wherein said triangles are cast concrete.

8. The system of claim 7 wherein reinforcement elements are placed in said concrete.

9. In a shore erosion system of the type having a series of individual modules joined to form a composite structure, the improvement comprising, each individual module having a substantially symmetrical equilateral triangle outside wall configuration, each module having a wall surface aligned substantially perpendicular to movement of waves, a series of baffles projecting from said wall surface, a control opening projecting through said wall surface, with baffles positioned about said opening, first reinforcement means disposed about the circumference of said triangle and second reinforcement means disposed concentric with said opening, wherein uniform wave dissipation occurs about any symmetrical outside wall.

* * * * *